United States Patent [19]

Naruki et al.

[11] Patent Number: 4,649,400

[45] Date of Patent: Mar. 10, 1987

[54] THERMAL PRINTER CONTROL DEVICE

[75] Inventors: Yukio Naruki; Takeshi Yasuda, both of Tokyo, Japan

[73] Assignee: Casio Computer Co., Ltd., Tokyo, Japan

[21] Appl. No.: 798,238

[22] Filed: Nov. 14, 1985

[30] Foreign Application Priority Data

Dec. 25, 1984 [JP] Japan .......................... 59-195393[U]

[51] Int. Cl.[4] .......................... G01D 15/10; B41J 3/20

[52] U.S. Cl. ................................ 346/76 PH; 400/120

[58] Field of Search ..................... 346/76 PH; 400/120

[56] References Cited

U.S. PATENT DOCUMENTS

| | | | |
|---|---|---|---|
| 4,070,587 | 1/1978 | Hanauata | 307/141 X |
| 4,409,599 | 10/1983 | Yasuda et al. | 346/76 PH |
| 4,475,114 | 10/1984 | Koyama et al. | 346/76 PH |

FOREIGN PATENT DOCUMENTS

| | | | |
|---|---|---|---|
| 130419 | 1/1985 | European Pat. Off. | 400/120 |
| 2008297 | 5/1979 | United Kingdom | 400/124 |

*Primary Examiner*—E. A. Goldberg
*Assistant Examiner*—Gerald E. Preston
*Attorney, Agent, or Firm*—Frishauf, Holtz, Goodman & Woodward

[57] ABSTRACT

In a thermal printer control device, gate circuits are provided between elements of a thermal head and a print controller. After the print controller has supplied a print start signal to the thermal head, a print signal control circuit detects if a print stop signal has been supplied from the controller within a predetermined time and, if not, closes the gate circuits to prevent supply of the print signals to the thermal head elements.

1 Claim, 6 Drawing Figures

THERMAL PRINTER CONTROL DEVICE

BACKGROUND OF THE INVENTION

This invention relates to a print control device for a thermal printer used in calculator printers and typewriters, etc., which print by a thermal head having thermal printing elements for contacting a thermal sensitive recording medium.

With the prior art thermal printer, the on-time of current supply to the thermal printing elements is controlled by either software or hardware. Software has the advantage that it is easy to control the printing density adjustment but the disadvantage that when the print flow is uncontrollable due to low battery voltage, noise, or static electricity, the printing signal continues to be applied to the thermal elements, which results in overheating and damage to the thermal elements.

With hardware-controlled on-time, the above disadvantages do not exist but the disadvantage of the on-time being set and therefore not being able to control the print density in relation to a printing pattern, does exist.

SUMMARY OF THE INVENTION

In consideration of the above, the object of the invention is to provide a print control device for a thermal printer in which the current supply time (on-time) to the thermal elements during normal printing is controlled by software, making possible the adjustment of print density, and in which the on-time is controlled by hardware when there is a runaway print flow to thereby prevent the thermal elements from being damaged.

In order to achieve this object, the thermal printer control device of this invention comprises:

thermal head means having thermal printing elements;

print controlling means for generating a print signal according to print data to be supplied to the thermal printing elements, of which the on-time is controlled with a program; and print signal control means for controlling the supply of the print signal to the thermal head when the print signal is output longer than a predetermined time.

With this kind of construction when a print end signal is not output from a printing control section after a specified time has elapsed from the output of a print start signal, it is possible to stop the application of the print signal to the thermal elements. Accordingly, on-time during normal operating conditions is controlled by software in the printing control section and, during abnormal operating conditions, by hardware which detects the absence of a print end signal. The result is that print density can be adjusted and damage to the thermal elements from runaway flow can be prevented.

DETAILED DESCRIPTION OF THE PREFERRED EMBODIMENTS

Figure 1:
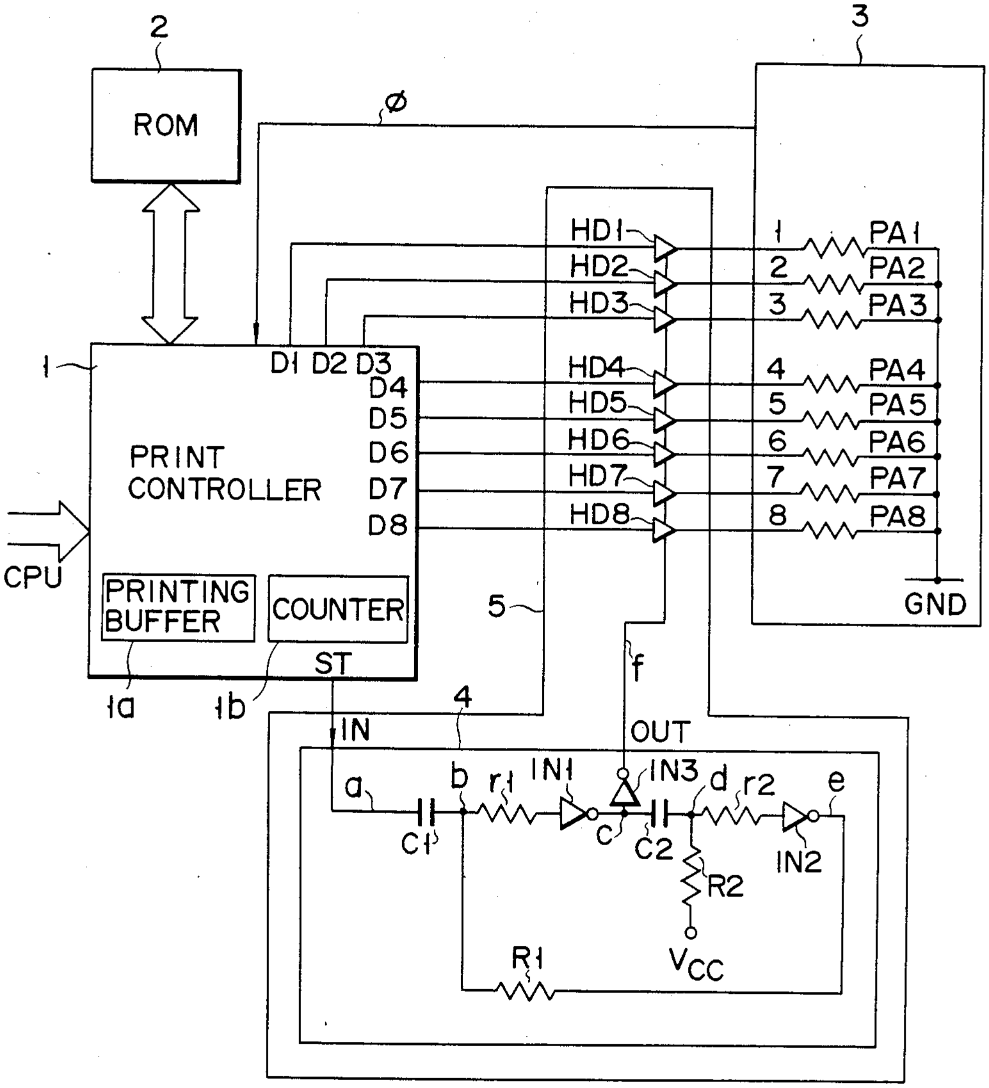
FIG. 1 is a circuit diagram of a thermal printer control device according to a first embodiment of the invention.

In FIG. 1, when a character code for one character is supplied to print controller 1, which includes printing buffer 1*a* and counter 1*b*, from the CPU, the code is transferred to print buffer 1*a* and, based on the stored character code of the buffer, character generator ROM 2 is referenced and one line of bit data of the bits constituting one character corresponding to the input character code is output, in this embodiment, as 8-bit print signals D1 to D8. These print signals are supplied to 8 thermal print elements PA1 to PA8 of thermal head 3 via corresponding head drivers HD1 to HD8, which are connected to the signal lines in between print controller 1 and thermal printing elements PA1 to PA8. The transmission and non transmission along these signal lines is controlled based on output (f) of on-time controller 4, which together with head drivers HD1 to HD8, forms print signal controller 5. A sync clock $\phi$ is output from thermal head 3 after the completion of each line of printing and supplied to print controller 1.

Print controller 1 supplies a print control signal ST based on the count value of counter 1*b* to on-time controller 4, which outputs a transmit and cut-off signal to head drivers HD1 to HD8 in response to print control signals ST. On-time controller 4 is constructed in such a way that when a print stop signal has not been input after a specified amount of time has elapsed from the input of a print start signal, head drivers HD1 to HD8 are automatically cut off.

On-time controller 4 comprises capacitor C1 and resistor R1, which form a first RC circuit, and capacitor C2 and resistor R2, which form a second RC circuit. The output of the first RC circuit is supplied to inverter IN1 via resistor r1 and then to the second RC circuit, whose output is supplied to inverter IN2 via resistor r2. The output of inverter IN2 in fed back to the node between capacitor C1 and resistor R1 (via resistor R1) of the first RC circuit. The output of inverter IN1, as well as being supplied to the second RC circuit, is output from on-time controller 4 via inverter IN3 and supplied to head drivers HD1 to HD8 to control their transmission or non transmission.

Figure 2:
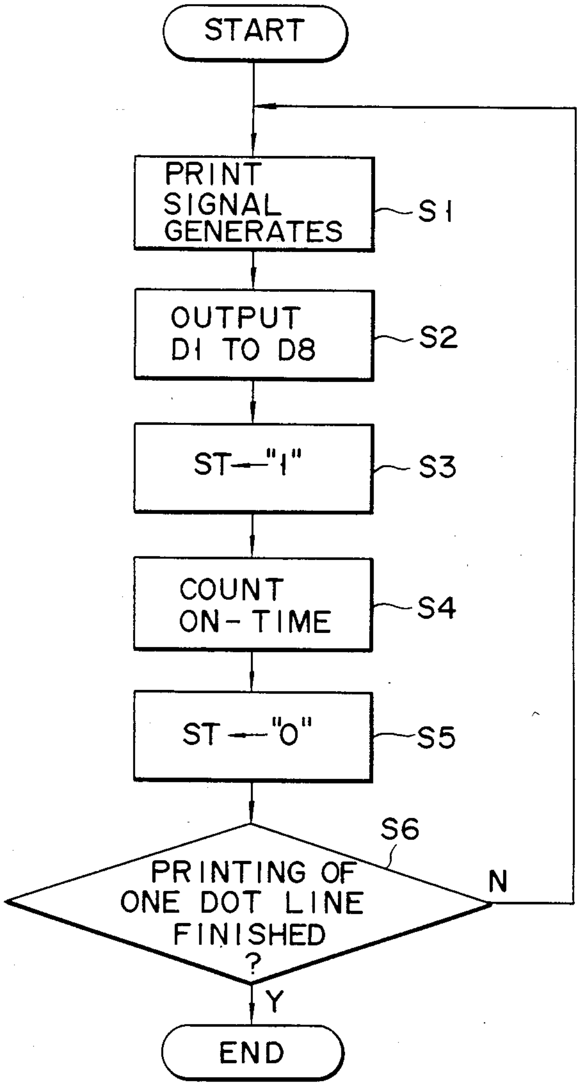
FIG. 2 is a flowchart showing the operation of the circuit shown in FIG. 1.
Figure 3:
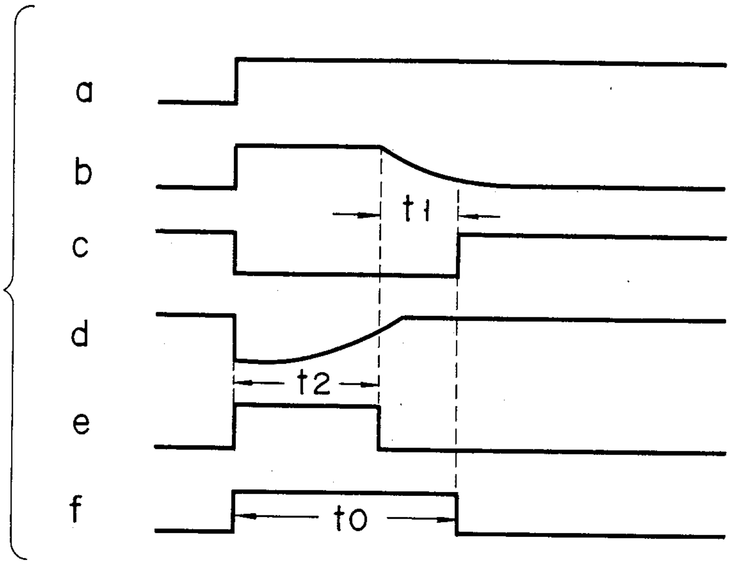
FIG. 3 is a timechart showing the operation of the above circuit during print flow runaway control.

The operation of this embodiment will next be described with reference to FIGS. 2 and 3. First the print flow carried out by print controller 1 will be described with reference to FIG. 1. When the print flow begins, character generator ROM 2 is accessed in response to the character code set in printing buffer 1*a* from the CPU and one line of bits of the plurality of bits comprising the one character that is read out, is output as an 8-bit print signal (steps S1, S2).

In step 3 ,control signal ST is made the high level (logical 1) of the binary level and thereby a print start signal "1" is supplied to on-time controller 4. Then, in step 4 counter 1*b* counts the on-time determined by the source voltage or size of the printed character, etc., after which the control signal ST is made the binary low level (logical 0) in step 5. In step 6 it is determined whether one dot line of the character has been printed, and if not, the process goes back to step 1 to print the second line of dots constituting the character. This process is repeated until all the lines of bits constituting one character have been printed.

Figure 4:
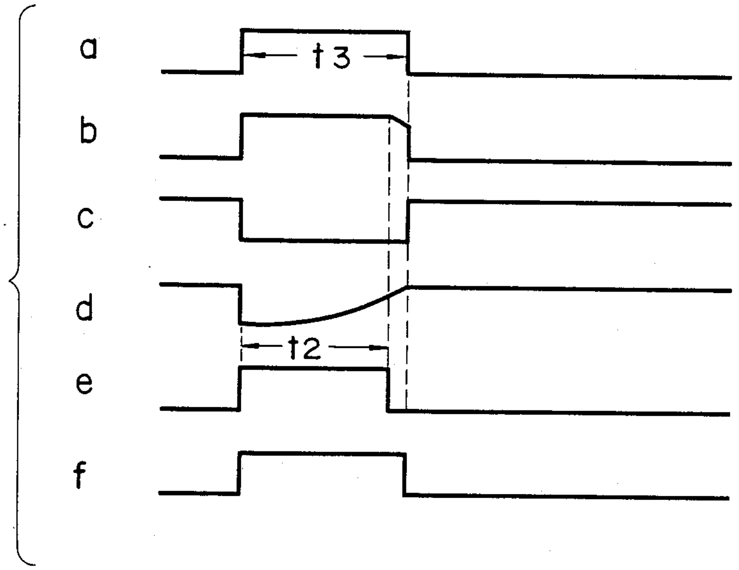
FIG. 4 is a timechart showing the operation of the above circuit during normal control.

The operation of on-time controller 4 is described with reference to FIGS. 3 and 4. The time chart of FIG. 3 shows the uncontrolled print flow and the time chart of FIG. 4 shows a normal print flow. In FIG. 3, when print control signal ST from print controller 1 is at high level, i.e., when a print start signal is output, the print start signal (a) is supplied to capacitor C1 of on-time controller 4 and the level of signal (b) from the node between capacitor C1 and resistor R1 becomes high. In this case, capacitor C1 is charged during the signal (e), which has the same potential as signal (b), i.e., at high level.

Signal (b) is supplied to inverter IN1 from where inverted signal (c) is supplied to capacitor C2. Signal (c) is again inverted this time by inverter IN3 and becomes signal (f). Signal (f) is output from on-time controller 4 and supplied to head drivers HD1 to HD8 as control signal "1". Consequently, head drivers HD1 to HD8 are able to transmit and thermal printing elements PA1 to PA8 corresponding to print signals D1 to D8 from print controller 1 start printing.

When signal (c) is supplied to capacitor C2, the node between capacitor C2 and resistor R2 becomes signal (d). When the voltage level of signal (d) reaches the threshold value of inverter IN2 in response to the time constant of capacitor C2 and resistor R2, output signal (e) of inverter IN2 becomes low level and capacitor C1 simultaneously starts to discharge. When the voltage level of signal (b) reaches the threshold value of inverter IN1, output signal (c) of inverter IN1 becomes high level and, consequently, signal (f) is determined by the sum of signal period t1, which is determined by the time constant of resistor R1 and capacitor C1, and signal period t2, which is determined by the time constant of resistor R2 and capacitor C2. Accordingly, even if the print start signal continues to be output, after a specified period of time has elapsed (a period too short for thermal printing elements PA1 to PA8 to be damaged), signal (f) becomes low level, head drivers HD1 to HD8 are cut off, and print signals D1 to D8 are not supplied to thermal printing elements PA1 to PA8 from print controller 1.

In this way, even if control signal ST remains at the high level as a result of a reduction in source voltage or noise, etc. and uncontrolled print flow occurs, when a period of time has elapsed that is too short for the thermal printing elements to be damaged by heat, print signals D1 to D8 are automatically cut off.

On the other hand, when the print flow is operating normally, after a specified period of time [t3 (t3 < t0)]has elapsed after print control signal ST has become high level, the signal becomes low level so the signals (a) to (f) shown in FIG. 4 are obtained. When signal (a) becomes high level, signal (f) becomes high and, when signal (a) becomes low level, signal f becomes low.

Figure 5:
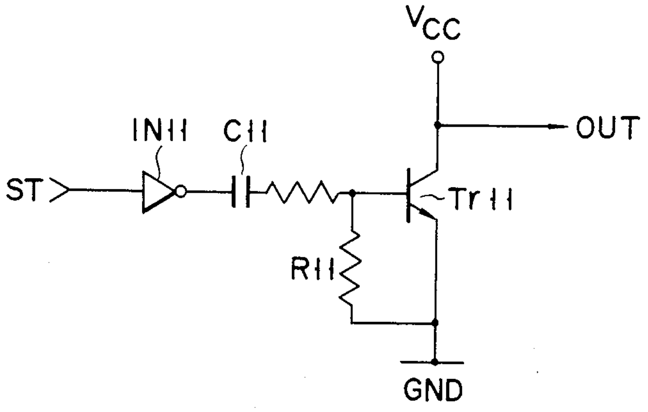
FIGS. 5 and 6 are circuit diagrams of on-time control section 4 shown in FIG. 1.

This invention is not limited to the above embodiment, but various modifications are possible without departing from the scope of the invention. For example, the on-time controller may have a circuit configuration such as that shown in FIGS. 5 and 6. In FIG. 5 the on-time controller has a RC circuit that comprises capacitor C11 and resistor R11. Print control signal ST is supplied to this RC circuit via inverter IN11 and the output of this RC circuit controls NPN transistor Tr11 so that the output OUT is supplied from the collector.

Figure 6:
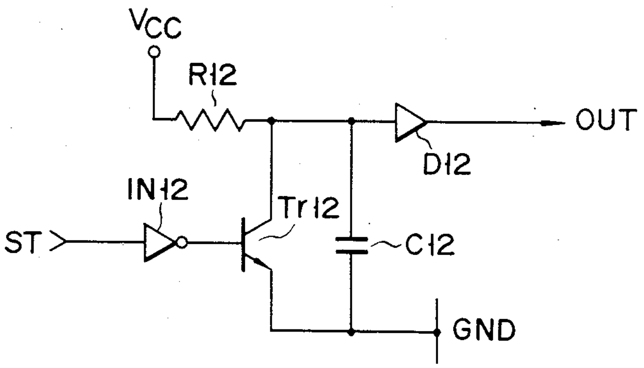

In FIG. 6 the RC circuit has NPN transistor Tr12 which is controlled by print control signal ST, which is input via inverter IN12. Capacitor C12 is connected in parallel to transistor TR12, and the circuit output of capacitor C12 and resistor R12 is supplied via driver D12 as the output OUT.

In the above embodiment a separate print controller was provided, but this function may be given to the CPU.

What is claimed is:

1. A thermal printer control device, comprising:

thermal head means including thermal printing elements for imprinting lines of dot patterns to form a character on a recording medium;

print controlling means including means for outputting print signals corresponding to the dot patterns of characters to be printed, means for outputting a print start signal of a certain duration corresponding to a time during which said thermal printing elements are to be energized in response to said print signals, means for counting to a determined count value after the output of the print start signal, and means for outputting a first print stop signal when said count value is attained by said counting means;

control circuit means for receiving the print start signal and the first print stop signal output from said print controlling means, and for outputting either of said first print stop signal or a second print stop signal in the absence of said first print stop signal from said print controlling means within a predetermined time after reception of the print start signal, so that a maximum energization time is established by the second print stop signal to prevent overheating of said printing elements; and gate circuit means coupled between said thermal head means, and said print controlling means and said control circuit means, for enabling the supply of the print signals to said thermal head means in response to the print start signal, and for blocking the print signals from driving said thermal head means in response to either of said first or said second print stop signals.

* * * * *